(12) United States Patent
Schwarz

(10) Patent No.: US 11,021,981 B2
(45) Date of Patent: Jun. 1, 2021

(54) DOWNSTREAM TURBINE VANE COOLING FOR A GAS TURBINE ENGINE

(71) Applicant: United Technologies Corporation, Farmington, CT (US)

(72) Inventor: Frederick M. Schwarz, Glastonbury, CT (US)

(73) Assignee: Raytheon Technologies Corporation, Farmington, CT (US)

(*) Notice: Subject to any disclaimer, the term of this patent is extended or adjusted under 35 U.S.C. 154(b) by 164 days.

(21) Appl. No.: 15/985,852

(22) Filed: May 22, 2018

(65) Prior Publication Data

US 2019/0360349 A1 Nov. 28, 2019

(51) Int. Cl.
*F01D 9/06* (2006.01)
*F01D 9/04* (2006.01)
(Continued)

(52) U.S. Cl.
CPC ............. *F01D 9/065* (2013.01); *F01D 9/048* (2013.01); *F01D 25/12* (2013.01); *F02C 3/073* (2013.01);
(Continued)

(58) Field of Classification Search
CPC .. F02C 7/143; F02C 7/185; F02C 3/13; F02C 6/08; F01D 9/065; F01D 9/048;
(Continued)

(56) References Cited

U.S. PATENT DOCUMENTS 6,189,324 B1 2/2001 Williams et al.
8,408,866 B2 4/2013 Weaver et al.
(Continued)

OTHER PUBLICATIONS

European Search Report for EP Application No. 19174746.8 dated Oct. 18, 2019.

*Primary Examiner* — Christopher Verdier
(74) *Attorney, Agent, or Firm* — Carlson, Gaskey & Olds, P.C.

(57) ABSTRACT

A gas turbine engine includes a main compressor section and a turbine section. The turbine section has a first turbine blade and vane and a downstream turbine component. A tap is configured to tap air from the compressor section at a location upstream of a most downstream location. The tap is connected to a heat exchanger. The heat exchanger is connected to a cooling compressor. The cooling compressor is connected to the downstream turbine component. A second tap is configured to tap air from a location in the main compressor section. The second tap is connected through a check valve to a line leading to the downstream turbine component. A control operates the cooling compressor such that when the cooling compressor is operating, air downstream of the cooling compressor is at a pressure higher than the pressure of the second tap, and the control is operational to selectively drive the cooling compressor at high power operation of an associated gas turbine engine, and to stop operation of the cooling compressor at lower power operations, such that air is delivered through the cooling compressor to the downstream turbine component at the high power operations, and air is delivered from the second tap at least some time when the cooling compressor is not operational. A method is also disclosed.

12 Claims, 2 Drawing Sheets

(51) Int. Cl.
*F02C 3/073* (2006.01)
*F02C 7/143* (2006.01)
*F04D 29/58* (2006.01)
*F02C 6/08* (2006.01)
*F02C 7/18* (2006.01)
*F01D 25/12* (2006.01)

(52) U.S. Cl.
CPC ............... *F02C 6/08* (2013.01); *F02C 7/143* (2013.01); *F02C 7/185* (2013.01); *F04D 29/5826* (2013.01); *F04D 29/5833* (2013.01); *F05D 2240/12* (2013.01); *F05D 2260/211* (2013.01); *F05D 2260/213* (2013.01); *F05D 2260/606* (2013.01); *F05D 2270/3062* (2013.01)

(58) Field of Classification Search
CPC ............ F01D 25/12; F05D 2260/211; F05D 2260/213; F05D 2260/606; F05D 2270/3062; F04D 29/5826; F04D 29/5833
See application file for complete search history.

(56) References Cited

U.S. PATENT DOCUMENTS

| | | | |
|---|---|---|---|
| 2009/0324388 A1* | 12/2009 | Takamura | F01D 11/001 415/116 |
| 2010/0192593 A1 | 8/2010 | Brown et al. | |
| 2016/0009399 A1* | 1/2016 | Schwarz | B64D 13/02 415/116 |
| 2016/0312711 A1* | 10/2016 | Suciu | F02K 3/06 |
| 2016/0312797 A1* | 10/2016 | Suciu | F01D 25/12 |
| 2017/0321564 A1 | 11/2017 | Bunker et al. | |
| 2018/0128176 A1* | 5/2018 | Staubach | F02C 7/143 |
| 2018/0128178 A1 | 5/2018 | Snape et al. | |
| 2018/0128179 A1 | 5/2018 | Staubach et al. | |
| 2019/0292985 A1* | 9/2019 | Schwarz | F02C 7/185 |
| 2019/0323430 A1* | 10/2019 | Schwarz | F02C 7/12 |
| 2019/0323431 A1* | 10/2019 | Schwarz | F02C 7/32 |
| 2020/0141270 A1* | 5/2020 | Schwarz | F01D 25/145 |

* cited by examiner

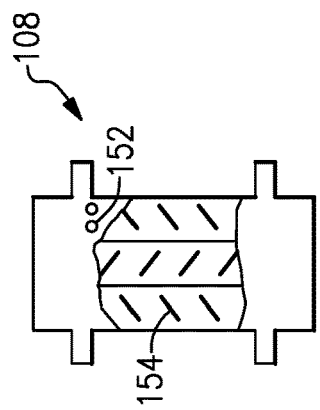
FIG.4
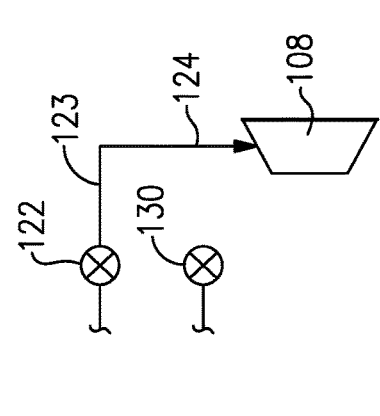
FIG.3D
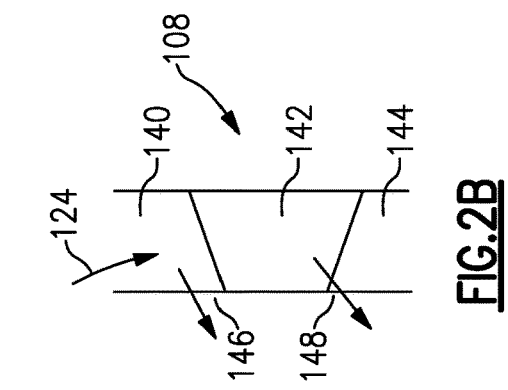
FIG.2B
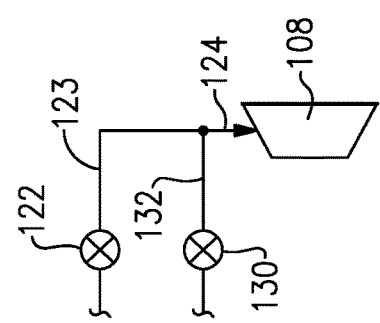
FIG.3C
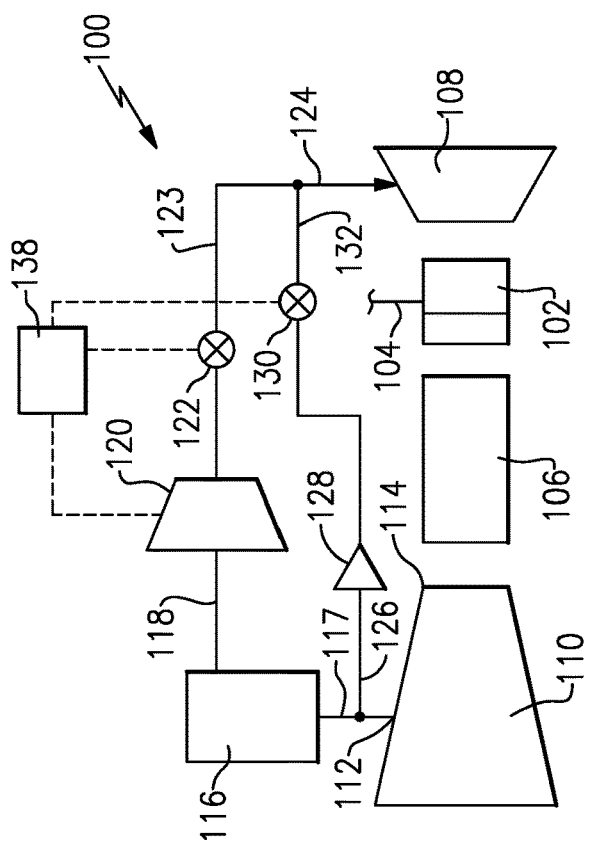
FIG.2A
FIG.3B
FIG.3A

DOWNSTREAM TURBINE VANE COOLING FOR A GAS TURBINE ENGINE

BACKGROUND

This application relates to a cooling system for a downstream vane in a gas turbine engine.

Gas turbine engines are known and typically include a fan delivering air into a bypass duct as propulsion air and into a compressor as core airflow. The air is compressed in the compressor and delivered into a combustor where it is mixed with fuel and ignited. Products of this combustion pass downstream over turbine sections, driving them to rotate.

As is known, the turbine section sees very high temperatures from the products of combustion and other operational challenges. As such, it is known to provide cooling to the rotors, blades, and vanes in the turbine section.

A good deal of study has been done to provide adequate cooling to the upstream or first turbine vane and blade stage.

In the past, downstream turbine vanes have been provided with cooling air generally at a single pressure.

SUMMARY

In a featured embodiment, a gas turbine engine includes a main compressor section and a turbine section. The turbine section has a first turbine blade and vane and a downstream turbine component. A tap is configured to tap air from the compressor section at a location upstream of a most downstream location. The tap is connected to a heat exchanger. The heat exchanger is connected to a cooling compressor. The cooling compressor is connected to the downstream turbine component. A second tap is configured to tap air from a location in the main compressor section. The second tap is connected through a check valve to a line leading to the downstream turbine component. A control operates the cooling compressor such that when the cooling compressor is operating, air downstream of the cooling compressor is at a pressure higher than the pressure of the second tap, and the control is operational to selectively drive the cooling compressor at high power operation of an associated gas turbine engine, and to stop operation of the cooling compressor at lower power operations, such that air is delivered through the cooling compressor to the downstream turbine component at the high power operations, and air is delivered from the second tap at least some time when the cooling compressor is not operational.

In another embodiment according to the previous embodiment, the second tap is connected to the first tap.

In another embodiment according to any of the previous embodiments, the downstream turbine component is a second stage turbine vane.

In another embodiment according to any of the previous embodiments, a controlled valve is provided intermediate the cooling compressor and the downstream turbine component and may be closed to block flow downstream of the cooling compressor by the control.

In another embodiment according to any of the previous embodiments, a second controlled valve is positioned between the second tap and the downstream turbine component, with the second controllable valve also being controlled by the control to selectively block flow to the downstream turbine component.

In another embodiment according to any of the previous embodiments, at high power operation the second controllable valve on the second tap is closed and the cooling compressor is operated and the first controllable valve is open such that high pressure air from the cooling compressor is delivered to the downstream turbine component.

In another embodiment according to any of the previous embodiments, in a first intermediate mode stage, both the first and second controllable valves are opened and the cooling compressor is stopped such that air is delivered from both the first and second taps to the downstream turbine component.

In another embodiment according to any of the previous embodiments, in a second intermediate cooling mode, the first controllable valve is closed, the cooling compressor is stopped, and the second controllable valve is opened such that air is only delivered from the second tap to the downstream turbine component.

In another embodiment according to any of the previous embodiments, in a lower cooling mode, the second controllable valve is closed, the cooling compressor is stopped and the first controllable valve is open such that only air downstream of the cooling compressor, which has not been compressed by the cooling compressor, is delivered to the downstream turbine component.

In another embodiment according to any of the previous embodiments, air downstream of the first and second controllable valves connects into a common line passing to the downstream turbine component.

In another featured embodiment, a gas turbine engine includes a main compressor section and a turbine section. The turbine section has a first turbine blade and vane and a downstream component. There is a means for tapping, and cooling a first air flow. There is a means for tapping a second air flow. There is a means for compressing the first air flow under high power operation of the gas turbine engine, and not compressing the first air flow under lower power operation of the gas turbine engine, such that compressed first air flow will be delivered to the downstream turbine component at the higher power conditions of the gas turbine engine, and air from the second air flow is delivered at lower power operation of the gas turbine engine.

In another embodiment according to the previous embodiment, the means for compressing a first air flow includes a cooling compressor and a control to stop compression.

In another embodiment according to any of the previous embodiments, the means for tapping a second air flow includes a check valve such that the second air flow does not pass to the downstream turbine component when the cooling compressor is compressing the first air flow.

In another featured embodiment, a method of operating a gas turbine engine includes the steps of tapping a first air flow from a main compressor section at a location upstream of a most downstream location, and passing the first air flow to a heat exchanger, and then to a cooling compressor, passing air downstream of the cooling compressor to a turbine component at a downstream location in a turbine section. A second air flow is tapped from a location in the main compressor section, and passing the second air flow through a check valve to a line leading to the turbine component, and operating the cooling compressor such that when the cooling compressor is operating, the first air flow is at a pressure higher than the pressure of said second air flow, and operating the cooling compressor at high power operation, and stopping operation of the cooling compressor at lower power conditions, such that the first air flow is delivered from the cooling compressor to the turbine component at the high power operations, and the second air flow is delivered at least at some times when the cooling compressor is not operational.

In another embodiment according to the previous embodiment, the turbine component is a second stage turbine vane.

In another embodiment according to any of the previous embodiments, a first controlled valve is provided intermediate the cooling compressor and the turbine component and is closed to block flow downstream of the cooling compressor.

In another embodiment according to any of the previous embodiments, a second controlled valve is positioned to block the second air flow to the turbine component.

In another embodiment according to any of the previous embodiments, at highest power operation the second controllable valve is closed and the cooling compressor is operated and the first controllable valve is open such that first air flow from the cooling compressor is delivered to the turbine component.

In another embodiment according to any of the previous embodiments, in a first intermediate mode stage, both the first and second controllable valves are opened and the cooling compressor is stopped such that both the first and second airflows pass to the turbine component.

In another embodiment according to any of the previous embodiments, in a second intermediate cooling mode, the first controllable valve is closed, the cooling compressor is stopped, and the second controllable valve is opened such that the second air flow is delivered to the turbine component.

These and other features may be best understood from the following drawings and specification.

BRIEF DESCRIPTION OF THE DRAWINGS

FIG. 2A schematically shows a cooling system for a downstream turbine vane stage.
FIG. 2B shows a detail of a turbine vane.
FIG. 3A shows a first cooling mode.
FIG. 3B shows a second cooling mode.
FIG. 3C shows a third cooling mode.
FIG. 3D shows a fourth cooling mode.
FIG. 4 shows a schematic turbine vane.

DETAILED DESCRIPTION

Figure 1:
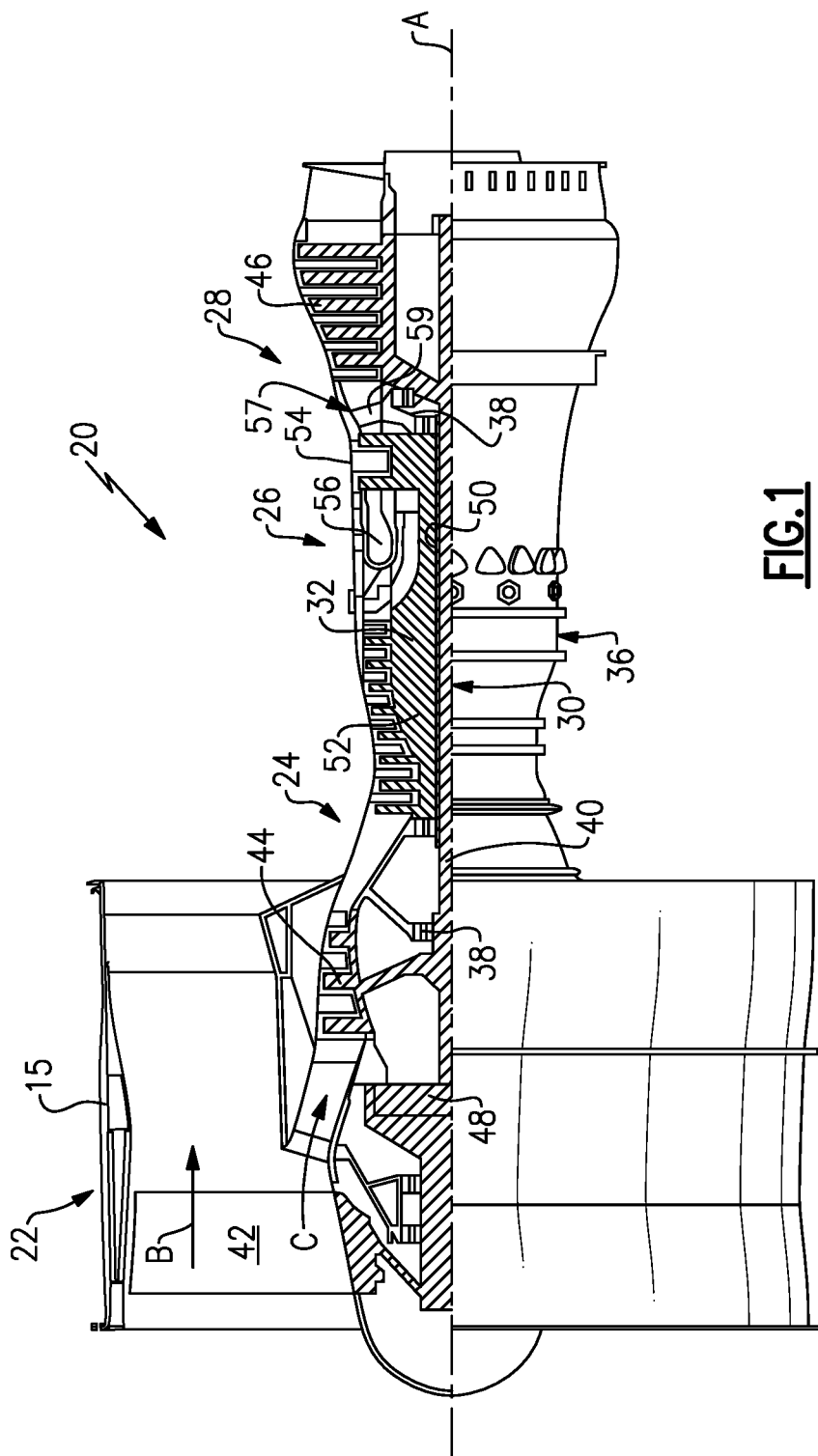
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]$^{0.5}$. The "Low corrected fan tip speed" as disclosed herein according to one non-limiting embodiment is less than about 1150 ft/second (350.5 meters/second).

FIG. 2A shows a cooling system 100. An upstream turbine blade and vane 102 is shown provided with cooling air 104. A combustor 106 is shown, as well as a second stage vane 108. While cooling air 104 is shown extending radially inwardly, in practice, the cooling air is often supplied downstream of a main compressor section 110, and radially inwardly of the combustor 106. However, for illustration simplicity, it is shown schematically in FIG. 2A.

Cooling air for the vane 108 is provided from a tap 112. Tap 112 is at a location which is upstream from a downstream most location 114 in the main compressor section 110. Air from the tap 112 passes through a heat exchanger 116, which may be cooled by cooling air. In one example, the heat exchanger may be cooled by bypass air.

A line 118 extends from the heat exchanger 116 and through a cooling compressor 120. A valve 122 is positioned downstream of the cooling compressor 120 and delivers air into a line 123 leading to an injection line 124 and passing into the vane 108. A second line 126 taps air from the tap 112 upstream of the heat exchanger 116 and passes that air through a check valve 128. It should be understood that the tap 126 could be a tap separate from the tap 112. Air downstream of the check valve 128 passes through a valve 130 into a line 132, which merges with line 123 into the line 124. A control 138 is shown schematically providing control for the compressor 120 and the valves 122 and 130.

FIG. 2B shows details of the vane 108. The cooling air provided at 124 passes into a platform section 140, an airfoil 142, and a platform section 148. There is a potential leakage path from the products of combustion downstream of blade 102, and into the platform sections 140 and 144, at points 146 and 148. The cooling air 124 is shown schematically passing outwardly to block flow into the potential leakage areas 146 and 148. To provide this blockage of flow, the cooling air 124 must have an adequately high pressure.

To that end, the cooling compressor 120 is operated at high power operation to provide cooling air to the line 124, which is at a pressure above that simply delivered into the line 132.

FIGS. 3A-3D show four potential modes of operation.

FIG. 3A shows a mode which may be utilized at takeoff and initial climb. The air in line 150 has been compressed by the cooling compressor 120 and the valve 122 is open. Valve 130 is closed. Air delivered into the line 124 is solely from the line 123 in this mode. Thus, the air 124 will be at a high enough pressure to block leakage.

FIG. 3B shows a second mode which may be utilized for complete of climb, as an example. The valve 130 is open and the cooling compressor 120 is stopped. Control 138 may open a clutch or simply stop rotation of a motor for the cooling compressor 120. Valve 122 is still open. Air, which has not been compressed by the cooling compressor 120, is delivered into line 123 and air in line 132 mixes at 124 with the air from line 123 to be delivered to the vane 108. This could be called a first intermediate mode.

At such conditions, it is not necessary to have air at as high a pressure as in the FIG. 3A condition. Notably, the FIGS. 3A and 3B modes might be provided without valve 122 or valve 130. The check valve 128 on its own might allow the flow shown in FIGS. 3A and 3B simply due to operation of the cooling compressor 120.

However, by including valves 122 and 130, further modes of operation can be achieved. As shown in FIG. 3C, the valve 122 is now closed. The valve 130 is open and air is delivered solely from the line 132 into the line 124. This can occur during conditions such as cruise. The lower volume flow improves efficiency. This could be called a second intermediate mode.

FIG. 3D shows yet a further reduction mode wherein the cooling potential provided is less than the modes of FIGS. 3A-3C. Here, the valve 130 is closed. The compressor 120 is stopped and the valve 122 is open. Only uncompressed air from line 123 reaches line 124 to be delivered to the vane 108. A volume lower than the FIG. 3C mode is provided, further increasing efficiency. This could be called a lower cooling mode.

It should be understood that FIGS. 3A-3D are schematic. The lines 132 and 123 exist in all four steps, but are not shown in the figures to illustrate from where air is being delivered.

By providing the higher pressure air during the most challenging positions, as shown in FIG. 3A, advantages can be achieved.

FIG. 4 is an example of a turbine vane 108. As known, turbine vane 108 has skin cooling holes, such as shown at 152, and internal cooling channels with heat transfer elements, such as trip strips, as shown at 154.

Turbine vanes in modern gas turbine engines are designed to handle increasing temperatures and pressures. Thus, in modern gas turbine engine designs, the walls of the turbine vane may be thinner, trip strips, the number of internal passes, the size of the holes, and the spacing between the holes may all be controlled to increase the cooling potential of the cooling air passing through the turbine vane 108.

Since the design of the turbine vane must be adequate to cool the turbine vane at the highest power conditions, a worker in this art has faced a design choice between increasing the cooling potential for the higher power conditions, and living with the efficiency losses from all of the additional cooling structures at lower power conditions. It should be understood that the typical features to increase cooling potential reduce the pressure loss across the turbine vane. Thus, a turbine vane designed for high cooling potential at high power operation would be undesirably inefficient at lower power operation as there is less resistance to flow and, a greater amount of cooling airflow at the lower power conditions.

However, given the cooling compressor 120 and its higher pressure operation at selected higher power conditions, the turbine vane 108 can be designed to have less cooling potential under the lower power conditions and when the cooling compressor 120 is not delivering further compressed cooling airflow. The higher pressure at conditions where the cooling compressor 120 is delivering its higher pressure air is able to provide adequate cooling to a turbine vane even for a turbine vane having lesser cooling potential.

Accordingly, relative to the prior art skin holes might be smaller or spread further apart or, internally the passages might be more narrow or the trips strips higher, all to reduce the flow and provide fuel consumption benefits to the engine during low power conditions when higher flow is not needed. But, at high power and with high pressure supplied by the cooling compressor, the flow through the vane will be adequate.

While the second stage vane 108 is shown, the cooling system disclosed herein could be utilized for turbine components downstream of the first stage blade and vane.

A gas turbine engine could be said to have a main compressor section and a turbine section. The turbine section has a first turbine blade and vane and a downstream component. There is a means for tapping, and cooling a first air flow and a means for tapping a second air flow. There is a means for compressing the first air flow under high power operation of the gas turbine engine, and not compressing the first air flow under lower power operation of the gas turbine engine. Thus, compressed air from the first air flow will be delivered to the downstream component at the high power conditions of the gas turbine engine, and air from the second air flow is delivered at lower power operation of the gas turbine engine.

A method of operating a gas turbine engine could be said to include the following steps. Tapping a first air flow from a main compressor section at a location upstream of a most downstream location, and passing the first air flow to a heat exchanger, and then to a cooling compressor. The first air flow is passed downstream of the cooling compressor to a turbine component at a downstream location in a turbine section. Further tapping a second air flow from a location in the main compressor section, and passing the second air flow through a check valve to a line leading to the turbine component, and operating the cooling compressor such that when the cooling compressor is operating, the first air flow is at a pressure higher than the pressure of said second air flow. Operating the cooling compressor at high power operation, and stopping operation of the cooling compressor at lower power conditions, such that the first air flow is delivered from the cooling compressor to the turbine component at the high power operations, and the second air flow is delivered at least at some times when the cooling compressor is not operational.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A gas turbine engine comprising:
    a main compressor section and a turbine section, said turbine section having a first turbine blade and vane and a downstream turbine component;
    a tap configured to tap air from said compressor section at a location upstream of a most downstream location, and said tap connected to a heat exchanger, the heat exchanger connected to a cooling compressor, and the cooling compressor connected to said downstream turbine component;
    a second tap configured to tap air from a location in said main compressor section, and said second tap connected through a check valve to a line leading to said downstream turbine component; and
    a control for operating said cooling compressor such that when said cooling compressor is operating, air downstream of said cooling compressor is at a pressure higher than the pressure of air from said second tap, and said control being operational to selectively drive said cooling compressor at high power operation of the gas turbine engine, and to stop operation of said cooling compressor at lower power operations, such that air is delivered through said cooling compressor to said downstream turbine component at the high power operation, and air is delivered from said second tap at least some time when said cooling compressor is not operational;
    wherein a first controlled valve is provided intermediate said cooling compressor and said downstream turbine component and may be closed to block flow downstream of the cooling compressor by said control; and
    wherein a second controlled valve is positioned between said second tap and said downstream turbine component, with said controlled valve also being controlled by said control to selectively block flow to the downstream turbine component.

2. The gas turbine engine as set forth in claim 1, wherein said second tap is connected to said first tap.

3. The gas turbine engine as set forth in claim 1, wherein said downstream turbine component is a second stage turbine vane.

4. The gas turbine engine as set forth in claim 1, wherein at the high power operation said second controlled valve on said second tap is closed and said cooling compressor is operated and said first controlled valve is open such that high pressure air from the cooling compressor is delivered to said downstream turbine component.

5. The gas turbine engine as set forth in claim 4, wherein in a first intermediate mode stage, both said first and second controlled valves are opened and said cooling compressor is stopped such that air is delivered from both said first and second taps to said downstream turbine component.

6. The gas turbine engine as set forth in claim 5, wherein in a second intermediate cooling mode, said first controlled valve is closed, said cooling compressor is stopped, and said second controlled valve is opened such that air is only delivered from said second tap to the downstream turbine component.

7. The gas turbine engine as set forth in claim 6, wherein in a lower cooling mode, said second controlled valve is closed, said cooling compressor is stopped and said first controlled valve is open such that only air downstream of the cooling compressor, which has not been compressed by the cooling compressor, is delivered to the downstream turbine component.

8. The gas turbine engine as set forth in claim 5, wherein air downstream of said first and second controlled valves connects into a common line passing to said downstream turbine component.

9. A method of operating a gas turbine engine including the steps of:
    tapping a first air flow from a main compressor section at a location upstream of a most downstream location, and passing said first air flow to a heat exchanger, and then to a cooling compressor, passing air downstream of the cooling compressor to a turbine component at a downstream location in a turbine section; and
    tapping a second air flow from a location in said main compressor section, and passing the second air flow through a check valve to a line leading to said turbine component, and operating said cooling compressor such that when said cooling compressor is operating, said first air flow is at a pressure higher than the pressure of said second air flow, and operating said cooling compressor at high power operation, and stopping operation of said cooling compressor at lower power conditions, such that the first air flow is delivered from said cooling compressor to said turbine component at the high power operation, and the second air flow is delivered at least at some times when said cooling compressor is not operational;

wherein a first controlled valve is provided intermediate said cooling compressor and said turbine component and is closed to block flow downstream of the cooling compressor;

wherein a second controlled valve is positioned to block said second air flow to said turbine component; and wherein at highest power operation said second controlled valve is closed and said cooling compressor is operated and said first controlled valve is open such that the first air flow from the cooling compressor is delivered to said turbine component.

10. The method of operating a gas turbine engine as set forth in claim 9, wherein said turbine component is a second stage turbine vane.

11. The method of operating a gas turbine engine as set forth in claim 9, wherein in a first intermediate mode stage, both said first and second controlled valves are opened and said cooling compressor is stopped such that both said first and second airflows flow to said turbine component.

12. The method of operating a gas turbine engine as set forth in claim 9, wherein in a second intermediate cooling mode, said first controlled valve is closed, said cooling compressor is stopped, and said second controlled valve is opened such that said second air flow is delivered to the turbine component.

* * * * *